United States Patent
Joo et al.

(10) Patent No.: US 8,867,239 B2
(45) Date of Patent: Oct. 21, 2014

(54) POWER SUPPLY DEVICE AND METHOD OF CONTROLLING THE SAME BY USING AN ADJUSTABLE POWER FACTOR CORRECTOR

(75) Inventors: Sung-yong Joo, Yongin-si (KR); Hyo-soon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1233 days.

(21) Appl. No.: 12/534,972

(22) Filed: Aug. 4, 2009

(65) Prior Publication Data

US 2010/0141037 A1 Jun. 10, 2010

(30) Foreign Application Priority Data

Dec. 10, 2008 (KR) .................. 10-2008-0124968

(51) Int. Cl.
| | |
|---|---|
| H02M 7/68 | (2006.01) |
| H02M 1/42 | (2007.01) |
| H02M 1/36 | (2007.01) |
| H02M 3/335 | (2006.01) |

(52) U.S. Cl.
CPC ........ *H02M 3/33523* (2013.01); *H02M 1/4208* (2013.01); *H02M 1/36* (2013.01); *Y02B 70/126* (2013.01)
USPC .......... 363/21.16; 363/21.13; 363/80; 363/89

(58) Field of Classification Search
USPC ............... 363/20, 21.01, 21.04, 21.07, 21.08, 363/21.09, 21.1, 21.11, 97, 21.12–21.18, 363/80, 89; 307/49, 52, 55, 60–64
See application file for complete search history.

(56) References Cited

U.S. PATENT DOCUMENTS

| | | | | |
|---|---|---|---|---|
| 5,134,355 | A | * | 7/1992 | Hastings ........................ 323/211 |
| 5,576,941 | A | * | 11/1996 | Nguyen et al. ............. 363/21.07 |
| 5,757,635 | A | * | 5/1998 | Seong ............................. 363/89 |
| 5,960,207 | A | | 9/1999 | Brown |
| 6,178,104 | B1 | * | 1/2001 | Choi ............................... 363/89 |
| 6,362,980 | B1 | * | 3/2002 | Ohashi et al. ............. 363/21.01 |
| 7,294,971 | B2 | * | 11/2007 | Jin ................................ 315/177 |

(Continued)

FOREIGN PATENT DOCUMENTS

EP    1 239 577 A2    9/2002

OTHER PUBLICATIONS

Extended European Search Report issued on Apr. 6, 2010 in counterpart European Application No. 09178322.5.

(Continued)

*Primary Examiner* — Adolf Berhane
*Assistant Examiner* — Henry Lee, III
(74) *Attorney, Agent, or Firm* — Sughrue Mion, PLLC

(57) ABSTRACT

Provided are a power supply device and a method of controlling the same. The power supply device includes: a power factor corrector which corrects a power factor of an initial power; a standby power supply unit which is connected to the power factor corrector, the standby power supply unit including a transformer which converts an input power received from the power factor corrector; a sensor which detects a level of an induced power corresponding to the input power; and a power supply controller which determines whether the level of the induced power exceeds a critical value, activates the power factor corrector to correct the power factor of the initial power if the level of the induced power exceeds the critical value, and supplies a driving power to the system based on the level of the induced power.

15 Claims, 4 Drawing Sheets

(56) References Cited

U.S. PATENT DOCUMENTS

| | | | |
|---|---|---|---|
| 7,453,248 B2* | 11/2008 | Takeuchi | 323/285 |
| 7,667,989 B2* | 2/2010 | Liu | 363/49 |
| 2004/0125620 A1* | 7/2004 | Yamashita | 363/21.01 |
| 2005/0128773 A1 | 6/2005 | Yang et al. | |
| 2005/0207189 A1 | 9/2005 | Chen | |
| 2007/0145956 A1 | 6/2007 | Takeuchi | |
| 2009/0135629 A1* | 5/2009 | Mancebo del Castillo Pagola | 363/34 |
| 2010/0213866 A1* | 8/2010 | Zhai et al. | 315/291 |

OTHER PUBLICATIONS

Communication dated Nov. 13, 2013, issued by the European Patent Office in counterpart European Application No. 09 178 322.5.

* cited by examiner

POWER SUPPLY DEVICE AND METHOD OF CONTROLLING THE SAME BY USING AN ADJUSTABLE POWER FACTOR CORRECTOR

CROSS-REFERENCE TO RELATED APPLICATION

This application claims priority from Korean Patent Application No. 10-2008-0124968, filed Dec. 10, 2008 in the Korean Intellectual Property Office, the disclosure of which is incorporated herein by reference in its entirety.

BACKGROUND OF INVENTION

1. Field of Invention

Apparatuses and methods consistent with the present invention relate to a power supply device and a method of controlling the same, and more particularly to a power supply device which has a power factor corrector and a method of controlling the same.

2. Description of the Related Art

A power supply device may include a power factor corrector to correct a power factor of input alternating current (AC) power. The power factor corrector is a kind of a power saving circuit which adjusts the phase of the voltage and an electric current to improve power efficiency in a power supply device. The power factor corrector controls electric power provided to a transformer, a stabilizer, etc., where temporary power leakage may occur. The power supply device having a power factor corrector requires a detection circuit to detect whether the input AC voltage is in error and a protection circuit to prevent error occurrence. These detection or protection circuits cause an increased power consumption in an electronic device and also an increased manufacturing cost of the electronic device.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a power supply device which consumes a substantially less power and reduces a manufacturing cost of the electronic device.

The present invention also provides a power supply device which is capable of detecting a plurality of power levels using a circuit with a simple structure.

According to an aspect of the present invention, there is provided a power supply device supplying driving power to a system, including: a power factor corrector which corrects a power factor of input initial power; a standby power supply unit connected with the power factor corrector which comprises a transformer to convert input power from the power factor corrector into a predetermined level of standby power; a sensor provided to a second coil of the transformer to detect a level of induced power corresponding to the input power; and a power supply controller which determines whether the level of the induced power exceeds a critical value when receiving a system-on signal, activates the power factor corrector if the level of the induced power exceeds the critical value, and supplies the driving power to the system on the basis of the level of the induced power detected after the power factor corrector is activated.

The initial power may bypass the power factor corrector before the power factor corrector is activated.

The power supply controller may determine whether the level of the induced power detected after the power factor corrector is activated is within a permissible range, and deactivate the power factor corrector if the level of the induced power is not within the permissible range.

The power supply controller may include a switch to deactivate the power factor corrector.

The permissible range may be from a lowest voltage to a highest voltage, and the lowest voltage is greater than the critical value.

The power supply controller may deactivate the power factor corrector if the level of the induced power is lower than the lowest voltage over a predetermined time.

The power supply device may further include a power conversion unit which converts power corrected in a power factor into the driving power to be supplied to the system, wherein the power supply controller deactivates the power conversion unit if the level of the induced power is not within the permissible range.

The sensor may include a sensing coil provided to the second coil of the transformer and having fewer turns than a first coil of the transformer; and a dividing resistor dividing voltage between both ends of the sensing coil.

The power supply controller may include an A/D converter converting voltage between the dividing resistors and voltage between ground points into a digital signal.

The power supply device may further include a capacitor connected between the power factor corrector and the standby power supply unit, wherein the level of the input power is the level of voltage between both ends of the capacitor.

According to another aspect of the present invention, there is provided a method of controlling a power supply device which includes a power factor corrector correcting a power factor of input initial power and a standby power supply unit connected with the power factor corrector which comprises a transformer to convert input power from the power factor corrector into a predetermined level of standby power and supplies driving power to a system, the method including: detecting a level of induced power corresponding to the input power; determining whether the level of the induced power exceeds a critical value when receiving a system-on signal; activating the power factor corrector if the level of the induced power exceeds the critical value; and supplying the driving power to the system on the basis of the level of the induced power detected after the power factor corrector is activated.

The initial power may bypass the power factor corrector before the power factor corrector is activated.

The supplying the driving power to the system may include determining whether the level of the induced power detected is within a permissible range; and blocking the driving power if the level of the induced power is not within the permissible range.

The blocking the driving power may include deactivating the power factor corrector.

The permissible range may be from a lowest voltage to a highest voltage, and the lowest voltage is greater than the critical value.

The supplying the driving power to the system may include determining whether the level of the induced power is lower than the lowest voltage over a predetermined time; and blocking driving power if the level of the induced power is lower than the lowest voltage over the predetermined time.

The power supply device may further include a power conversion unit converting power corrected in a power factor into the driving power to be supplied to the system, the method may further include deactivating the power conversion unit if the level of the induced power is not within the permissible range.

The power supply device may include a sensing coil provided to a second coil of the transformer and having fewer turns than a first coil of the transformer; and a dividing resistor dividing voltage between both ends of the sensing coil, the sensing the level of the induced power comprising converting voltage between the dividing resistors and voltage between ground points into a digital signal.

BRIEF DESCRIPTION OF THE DRAWINGS

The above and/or other aspects of the present invention will become apparent and more readily appreciated from the following description of exemplary embodiments, with reference to the accompanying drawings, in which.

DETAILED DESCRIPTION OF EXEMPLARY EMBODIMENTS

Figure 1:
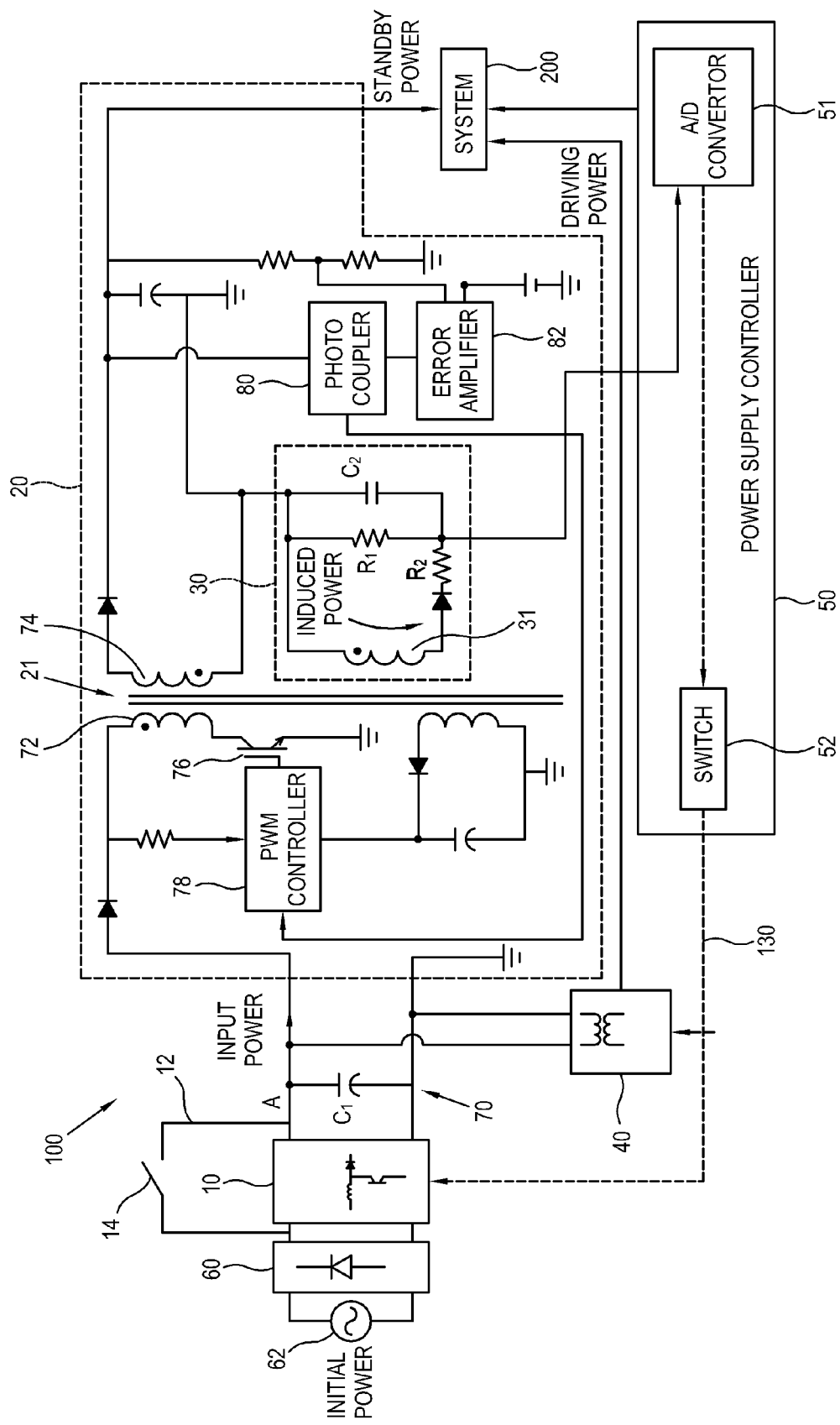
FIG. 1 is a schematic circuit diagram of a power supply device according to an exemplary embodiment of the present invention.

Exemplary embodiments of the present invention are described in greater detail below with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

FIG. 1 is a schematic circuit diagram of a power supply device according to an exemplary embodiment of the present invention. As shown in FIG. 1, a power supply device 100 includes a power factor corrector 10, a standby power supply unit 20, a sensor 30, a power conversion unit 40, and a power supply controller 50 controlling the foregoing components. The power supply device 100 further includes a rectifier 60 connected between the power factor corrector 10 and an initial power supply 62. A capacitor 70 (C1) is connected to an output terminal of the power factor corrector 10. The power supply device 100 provides a standby power and a driving power to a system 200 having a plurality of driving devices. The power supply device 100 and the system 200 may include various electronic devices including a television (TV) which receives and displays a broadcasting signal, a computer system, etc.

Initial power input to the power supply device 100 may be supplied by a commercial AC power supply and smoothed into direct current (DC) power by the rectifier 60. The initial power supply 62 supplies an initial power that has a voltage of about 90 VAC to about 260 VAC. If the initial power has a voltage level less than a predetermined critical value, the system 200 is not provided with normal driving power or if supplied with the driving power, does not properly operate because of the power ripples.

The power supply device 100 may further include an electromagnetic interference (EMI) filter to control noise occurring when the initial power is input, or high-frequency switching noise occurring in the power supply device 100.

The power factor corrector 10 is a correction circuit to correct a power factor of the initial power and output a constant voltage despite frequent variations of input power. The power factor corrector 10 may include a coil to correct a power factor, a switching component, a rectifying diode, and a controller controlling the switching component. Hereinafter, the term "input power" is defined as power output from the power factor corrector 10 to be input to the standby power supply unit 20 and the power conversion unit 40. That is, power at a node A in FIG. 1 is the input power. The input power has a voltage level higher than the DC power output from the rectifier 60 by a power factor correction. The voltage level of the input power is maintained within a predetermined permissible range. If it is not within the permissible range, the input power supply is suspended to protect the power conversion unit 40 and the system 200. For example, if the input power has a voltage level that is not within a permissible range of about 380 VDC to about 410 VDC, it is not supplied to the power conversion unit 40 and the system 200.

The standby power supply unit 20 is connected to the power factor corrector 10 and supplies standby power to the system 200. The standby power is a minimum power to receive a system-on signal by a user when the power supply device 100 is supplied with the initial power and the system 200 is in a standby mode and does not perform a normal operation. The standby power is supplied to the system 200 when the initial power is input to the power supply device 100 and has a voltage level of about 3 VDC to about 7 VDC. The input power input to the standby power supply unit 20 corresponds to a level of the initial power in the case of a standby mode and corresponds to a level of power corrected by correction of a power factor by the power factor corrector 10 in the case where the power factor corrector 10 is activated to operate. For example, in the standby mode, the power factor corrector 10 does not operate. Initial power is rectified and bypasses the power factor corrector 10, for example, via a bypass line 12 and a switch 14. The input power has a level which changes dependent on whether the power factor corrector 10 is activated.

The standby power supply unit 20 includes a transformer 21 converting the input power to a predetermined level of the standby power. The transformer 21 includes first and second coils 72 and 74. The standby power supply unit 20 further includes a switching component 76, a pulse width modulation (PWM) controller 78 to PWM-control the switching component 76, a photo coupler 80, an error amplifier 82, and a plurality of resistors and diodes, shown in FIG. 1.

The sensor 30 is coupled to the second coil 74 of the transformer 21 in the standby power supply unit 20 to detect a level of the induced power corresponding to the input power. The sensor 30 includes a sensing coil 31 coupled to the second coil 74 of the transformer 21 and dividing resistors R1 and R2 connected to both ends of the sensing coil 31. The sensing coil 31 may have fewer turns than the first coil 72 of the transformer 31. For example, the sensing coil 31 may have one or two turns.

The input power input to the first coil 72 of the transformer 21 is induced by the sensing coil 31 corresponding to the second coil 74. Hereinafter, power induced by the sensing coil 31 is defined as the "induced power." The induced power increases or decreases corresponding to the input power and has a voltage level proportionate to a voltage level of the input power. The induced power is detected as a voltage between the dividing resistors R1 and R2 and is output to the power supply controller 50. The induced power has a voltage level in a range adjustable by the turns of the sensing coil 31 and the resistance values of the dividing resistors R1 and R2.

As described above, the initial power or the power corrected by the power factor corrector 10 is input as the input power to the standby power supply unit 20, induced into the induced power by the sensing coil 31, and divided by the dividing resistors R1 and R2, thereby being input to the power supply controller 50.

In a related art, sensing circuits to detect the input power are distributed at an input node of the initial power, an output node of the power factor corrector, etc., and are supplied with the separate power to cause the increase of the power consumption in a standby mode.

In the present exemplary embodiment, however, since the sensor 30 is provided in the standby power supply unit 20 to which the input power is supplied, the power supply device 100 does not have to provide the separate power to the sensor 30.

The capacitor 70 having a substantially great capacity is connected between the power factor corrector 10 and the standby power supply unit 20. The capacitor 70 serves to remove noise, so that the input power has a constant voltage, and to reduce ripples. The capacitor 70 has a capacity determined by the load of the system 200.

The power conversion unit 40 is connected to the power factor corrector 10 to receive the power corrected by the correction of the power factor and convert the corrected power into the driving power necessary for the system 200. The power conversion unit 40 may include a DC/DC converter and/or an inverter and a transformer to convert to a required power level. The power conversion unit 40 may not operate if the power output from the power factor corrector 10 is not within a normal operational range.

The power supply controller 50 determines whether a level of the induced power detected by the sensor 30 exceeds a critical value when receiving a system-on signal and activates the power factor corrector 10 based on the result of detection. If the level of the induced power exceeds the critical value, the power supply controller 50 activates the power factor corrector 10 to correct a power factor of the initial power. The corrected power is provided to the power conversion unit 40. However, if the level of induced power is equal to the critical value or less, i.e., the input power has a voltage level which is unstable or not capable to drive the system 200, the power supply controller 50 does not activate the power factor corrector 10. In this case, the power factor corrector 10 may suspend the power supply to protect the system 200 including the power factor corrector 10.

If the power factor corrector 10 is activated, the initial power is corrected so that a level of the input power is increased. Accordingly, a level of the induced power also increases. The power supply controller 50 judges whether a level of the induced power detected after activating the power factor corrector 10 is within a predetermined permissible range and determines whether to supply the driving power to the system 200. If the level of input power is within the permissible range, the power supply controller 50 considers the power factor corrector 10 to be operating properly and keeps the power factor corrector 10 being activated. At this point, the power conversion unit 40 can be activated if it was previously deactivated. If the level of the induced power is not within the permissible range, the power factor corrector 10 and the power conversion unit 40 are deactivated and the system 200 is not provided with the driving power.

The power supply controller 50 includes an A/D converter 51 to convert the voltage between the dividing resistors R1 and R2 into a digital signal.

Figure 2:
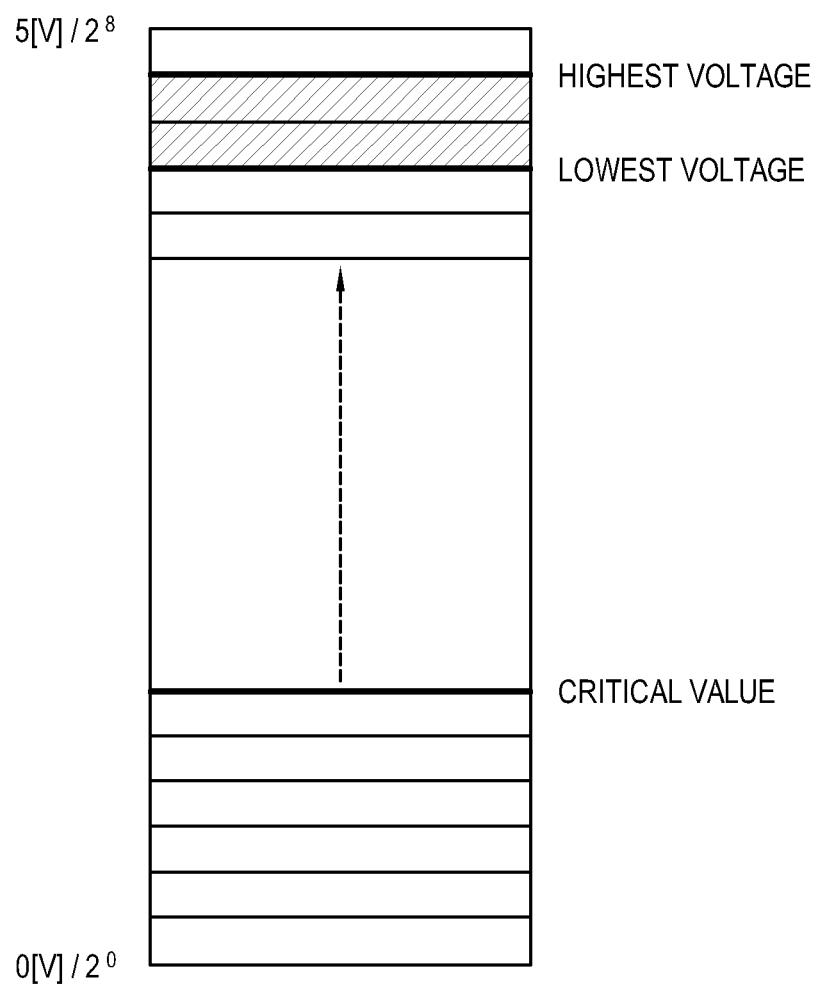
FIG. 2 illustrates a power level detected by a sensor of FIG. 1.

FIG. 2 illustrates a voltage level of the induced power detected by the sensor 30 converted into a digital signal. A voltage level of the induced power is converted into a digital signal, i.e., a binary number, by the A/D converter 51. The A/D converter 51 of the present exemplary embodiment may convert a voltage range from 0 V to about 5V DC into 8-bit values, i.e., 256 values, where 0 V and 5V DC are expressed as $2^0$ and $2^8$, respectively.

As described above, the voltage level of the induced power may be in a range adjustable by the turns of the sensing coil 31 and the resistance values of the dividing resistors R1 and R2 so that the voltage between the dividing resistors R1 and R2 is from 0 V to about 5 VDC.

In FIG. 2, the critical value indicates a reference value to determine whether to allow the input of the initial power. The highest and lowest voltage values indicate reference lower and higher voltage level limit values to determine whether to allow the input or the corrected input power. The permissible range is between the highest voltage and the lowest voltage, wherein the lowest voltage is greater than the critical value, as shown in FIG. 2.

In a prior art, two protection circuits, i.e., an over voltage protection circuit and an under voltage protection circuit, are provided to detect whether power output from the power factor corrector has a level exceeding the highest voltage or is equal to the lowest voltage or less.

In the present exemplary embodiment, however, a plurality of sensing circuits as well as a protection circuit are not provided. The single A/D converter 51 may be used to detect an extent of the input power over time.

Figure 3:
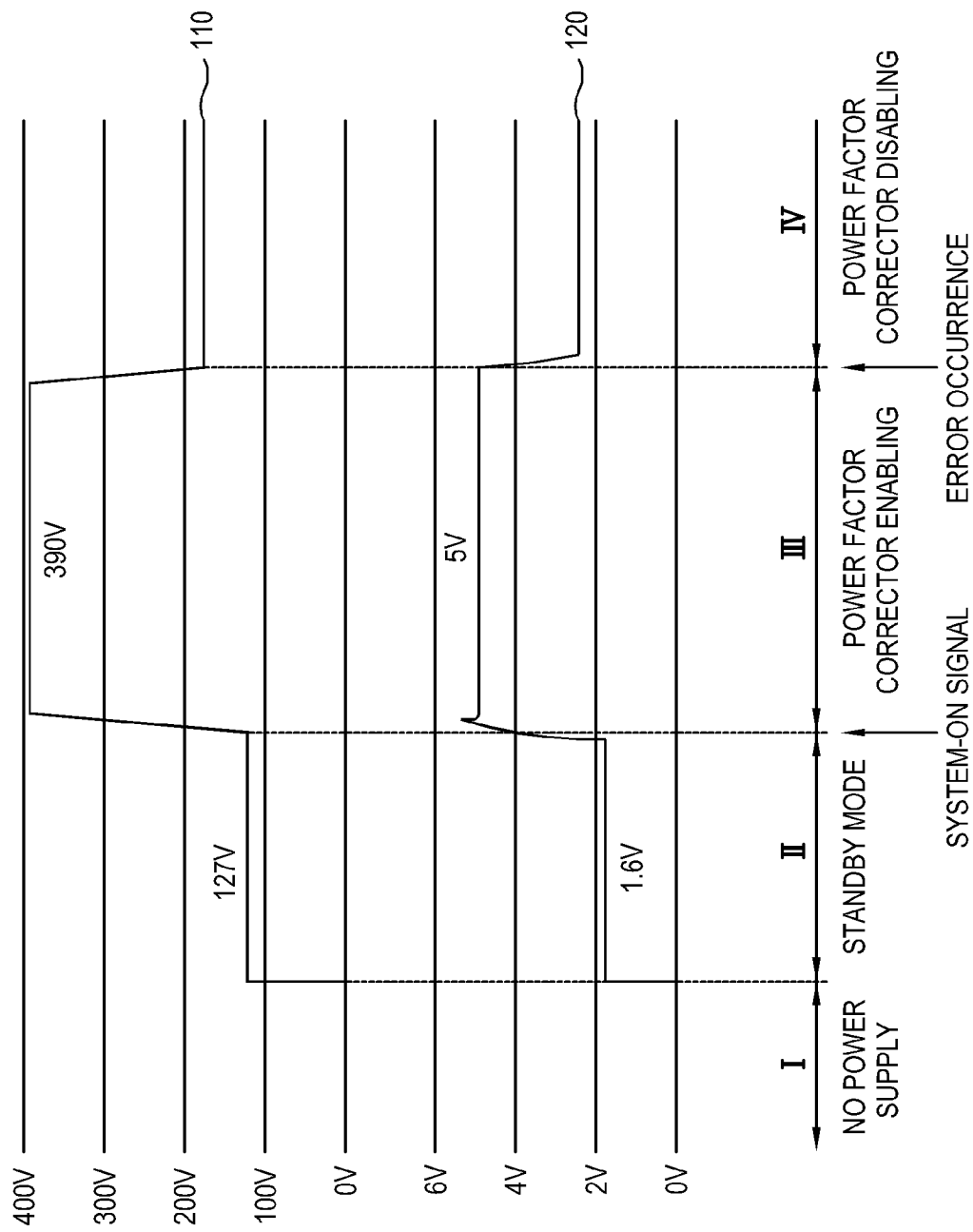
FIG. 3 illustrates signal waveform diagrams of input power and induced power in the power supply device of FIG. 1.

FIG. 3 illustrates signal waveforms of the input power 110 and induced power 120 in the power supply device according to an exemplary embodiment of the present invention. As shown in FIG. 3, the input power 110 and the induced power 120 have waveforms which are scaled differently but vary in the same form corresponding to the events I, II, III, and IV. During event I, the power is not supplied. The input power and induced power have a voltage of 0 V. During event II, which is a standby mode when the initial power is supplied, the input power has a voltage of about 127 VDC, and the induced power has a voltage of about 1.6 VDC. The initial AC power of about 90 VAC is smoothed by the rectifier 60 to have a level of about 127 VDC, as shown. Given the initial power having a critical value of about 70 VAC, if the detected induced power is 1.24 VDC or less, the power supply controller 50 does not activate the power factor corrector 10. The critical value may be set dependent on a change in a level of the initial power.

If a system-on signal is generated in the standby mode, the input power increases to about 390 VDC, and the induced power rises to about 5 VDC. The power supply controller 50 determines whether the level of the induced power is within a permissible range, and activates the power factor corrector 10 and the power conversion unit 40 if the induced power level is within the permissible range.

If the induced power abruptly decreases to be out of the permissible range while the power factor corrector 10 and the power conversion unit 40 operate during event IV, the power supply controller 50 deactivates the power factor corrector 10 and the power conversion unit 40 to suspend supply of the driving power.

If the induced power is lower than the lowest voltage of the permissible range but exceeds the critical value, the power factor corrector 10 is deactivated. The power supply controller 50 adopts different reference values according to time in determining whether to allow the induced power to be output from the sensor 30. Accordingly, the power supply controller 50 may determine that the level of power satisfies different reference values although not having a plurality of sensors.

If it is determined that the induced power is lower than the lowest voltage of the permissible range after activating the power factor corrector 10, the power supply controller 50 determines whether the induced power is lower than the lowest voltage over a predetermined time.

A variety of tests are carried out to guarantee the quality of the power supply device 100, in which an instantaneous interruption test is conducted while the initial power is not supplied for a predetermined time, i.e., periods 1 to 5. During the instantaneous interruption test, the power output from the power factor corrector 10 drops rapidly. Even if the induced power is determined to be lower than the lowest level, normal initial power is immediately input to the power supply device 100 after the instantaneous interruption test. Thus, the power supply controller 50 determines that only the induced power being lower than the lowest voltage over a predetermined time is abnormal power, but determines the induced power being lower than the lowest voltage within the predetermined time is in the instantaneous interruption test, thereby maintaining the power factor corrector 10 to be activated. In the present exemplary embodiment, as the lowest voltage is set in consideration of the instantaneous interruption test, additional control is not required for the test.

The power supply controller 50 includes a switch 52 controlling a control signal 130 to activate or deactivate the power factor corrector 10 and the power conversion unit 40. A plurality of switches 52 may be provided to activate or deactivate the power factor corrector 10 and the power conversion unit 40 separately. Also, a single switch 52 may be provided to activate or deactivate the power factor corrector 10 and the power conversion unit 40.

Figure 4:
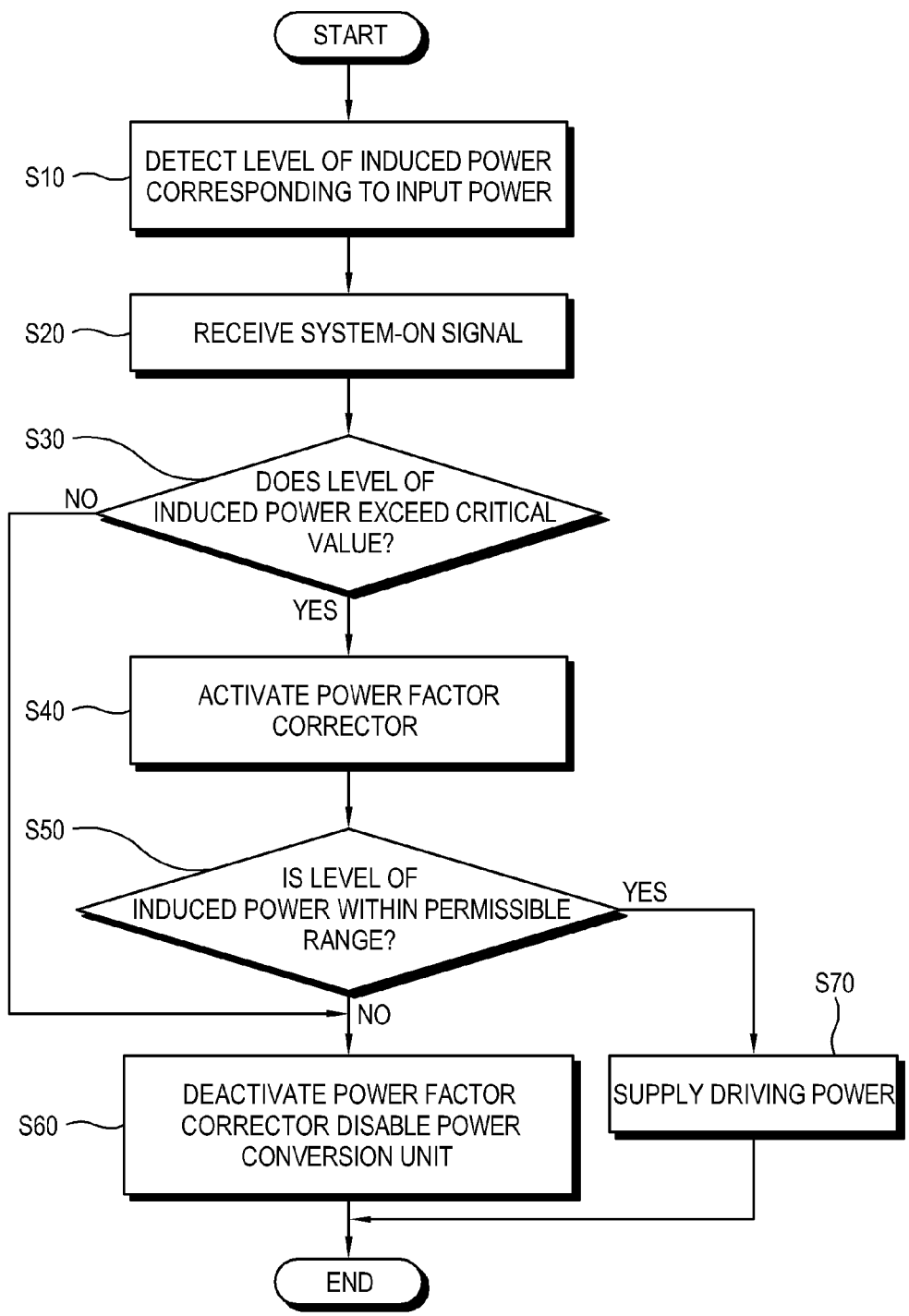
FIG. 4 is a flow chart for a method of controlling the power supply device of FIG. 1.

FIG. 4 is a flow chart to illustrate a method of controlling the power supply device of FIG. 1. Hereinafter, the method of controlling the power supply device according to the present exemplary embodiment is described briefly with reference to FIG. 4.

A level of the induced power corresponding to the input power is detected in a standby mode (S10). The induced power is induced by the sensing coil 31 and is changed proportionately to a level of the input power.

Then, a system-on signal is received (S20), and the power supply controller 50 determines whether the level of the induced power exceeds a critical value (S30).

If the level of the induced power is greater than the critical value, the power supply controller 50 activates the power factor corrector 10 and the power conversion unit 40 simultaneously or sequentially (S40).

If the level of the induced power is equal to or less than the critical value, the power supply controller 50 deactivates the power factor corrector 10 and the power conversion unit 40 (S60).

When the power factor corrector 10 is activated, the power supply controller 50 determines whether the level of the induced power is within a permissible range (S50). That is, the induced power is being detected, and a reference value to determine whether the induced power is within the permissible range is changed after the power factor corrector 10 is activated.

If the level of the induced power is within the permissible range, the driving power is supplied to the system 200 (S70).

However, if the level of the induced power is not within the permissible range, the power supply controller 50 deactivates the power factor corrector 10 and the power conversion unit 40 (S60).

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A power supply device for supplying driving power to a system, the power supply device comprising:
   a power factor corrector which corrects a power factor of an initial power;
   a standby power supply unit which is connected to the power factor corrector, the standby power supply unit comprising a transformer which converts an input power received from the power factor corrector to a predetermined level of a standby power and comprises first and second coils, and a sensor which is coupled to the second coil of the transformer and detects a level of an induced power corresponding to the input power; and
   a power supply controller which determines whether the level of the induced power exceeds a critical value when a system-on signal is received, activates the power factor corrector to correct the power factor of the initial power if the level of the induced power exceeds the critical value, and supplies a driving power to the system based on the level of the induced power detected after the power factor corrector is activated,
   wherein the power supply controller determines whether the level of the induced power detected after the power factor corrector is activated is within a predetermined permissible range, and deactivates the power factor corrector if the level of the induced power is not within the predetermined permissible range, and
   wherein a maximum value of the predetermined permissible range is greater than the critical value.

2. The power supply device according to claim 1, wherein the power supply controller comprises a switch which selectively deactivates the power factor corrector.

3. The power supply device according to claim 1, wherein the predetermined permissible range is from a lowest voltage to a highest voltage, and the lowest voltage is greater than the critical value.

4. The power supply device according to claim 3, wherein the power supply controller determines whether the level of the induced power is less than the lowest voltage over a predetermined time, and deactivates the power factor corrector if the level of the induced power is less than the lowest voltage over a predetermined time.

5. The power supply device according to claim 1, further comprising:
   a power conversion unit which converts power corrected by the power factor corrector into the driving power to be supplied to the system,
   wherein the power supply controller deactivates the power conversion unit if the level of the induced power is not within the predetermined permissible range.

6. The power supply device according to claim 1, wherein the sensor comprises:
   a sensing coil which is coupled to the second coil and has fewer turns than the first coil of the transformer; and
   dividing resistors which are connected to the sensing coil and divide a voltage between both ends of the sensing coil.

7. The power supply device according to claim 6, wherein the power supply controller comprises an A/D converter which converts voltage between the dividing resistors and voltage between ground points into a digital signal.

8. The power supply device according to claim 1, further comprising a capacitor connected between the power factor corrector and the standby power supply unit, wherein the level of the input power is equal to a level of voltage across the capacitor.

9. A method for controlling a power supply device comprising a power factor corrector which corrects a power factor of initial power, and a standby power supply unit which is connected to the power factor corrector and comprises a transformer to convert a received input power to a predetermined level of a standby power and supply a driving power to a system and a sensor coupled to an output side of the transformer, the method comprising:
    detecting a level of an induced power corresponding to the input power by using the sensor coupled to an output side of the transformer;
    determining whether the level of the induced power exceeds a critical value when a system-on signal is received;
    activating the power factor corrector if the level of the induced power exceeds the critical value; and
    supplying the driving power to the system based on the level of the induced power detected after the power factor corrector is activated by determining whether the level of the induced power detected after the power factor corrector is activated is within a predetermined permissible range, and deactivating the power factor corrector if the level of the induced power is not within the predetermined permissible range,
    wherein a maximum value of the predetermined permissible range is greater than the critical value.

10. The method according to claim 9, wherein the predetermined permissible range is from a lowest voltage to a highest voltage, and the lowest voltage is greater than the critical value.

11. The method according to claim 10, wherein the supplying the driving power to the system comprises:
    determining whether the level of the induced power is less than the lowest voltage over a predetermined time; and
    blocking driving power if the level of the induced power is lower than the lowest voltage over the predetermined time.

12. The method according to claim 9, wherein the power supply device further comprises a power conversion unit which converts power corrected by the power factor corrector into the driving power to be supplied to the system, the method further comprising:
    deactivating the power conversion unit if the level of the induced power is not within the predetermined permissible range.

13. The method according to claim 9, wherein the power supply device comprises a sensing coil coupled to a second coil of the transformer and having fewer turns than a first coil of the transformer and dividing resistors which divide voltage between both ends of the sensing coil, and
    wherein the sensing the level of the induced power comprises converting voltage between the dividing resistors and voltage between ground points into a digital signal.

14. A power supply device comprising:
    a power factor corrector which is coupled to a source of an initial power, and corrects a power factor of the initial power to output a corrected input power; and
    a standby power supply unit which is connected to the power factor corrector, and selectively receives one of the initial power or the corrected input power, the standby power supply unit comprising:
    a transformer which converts one of the received initial power and the corrected input power and comprises first and second coils;
    a sensor which is coupled to the second coil and senses an induced power in the second coil corresponding to a level of one of the received initial power and the corrected input power; and
    a power supply controller which determines whether the level of the induced power exceeds a critical value when a system-on signal is received, activates the power factor corrector to correct the power factor of the initial power and supply the corrected input power to the standby power supply unit if the level of the induced power exceeds the critical value, and supplies a driving power to the system based on the level of the induced power detected after the power factor corrector is activated,
    wherein the power supply controller determines whether the level of the induced power detected after the power factor corrector is activated is within a predetermined permissible range, and deactivates the power factor corrector if the level of the induced power is not within the predetermined permissible range, and
    wherein a maximum value of the predetermined permissible range is greater than the critical value.

15. The power supply device according to claim 14, wherein the power supply controller comprises a switch which deactivates the power factor corrector if the level of the induced power detected after the power factor corrector is activated is less than a predetermined lower voltage limit value or greater than a predetermined higher voltage limit value.

* * * * *